(12) United States Patent
Lee et al.

(10) Patent No.: US 6,533,994 B2
(45) Date of Patent: Mar. 18, 2003

(54) ALKALINE, REFRACTORY CERAMIC HOLLOW ITEM

(75) Inventors: Steven Lee, Schottland (GB); Dirk Masurat, Würselen (DE); Ian Proudfoot, Glasgow (GB); Jim McIntosh, Glasgow (GB)

(73) Assignee: Didier-Werke AG (DE)

( * ) Notice: Subject to any disclaimer, the term of this patent is extended or adjusted under 35 U.S.C. 154(b) by 0 days.

(21) Appl. No.: 09/734,425

(22) Filed: Dec. 11, 2000

(65) Prior Publication Data
US 2002/0093129 A1 Jul. 18, 2002

(51) Int. Cl.[7] ............................................. C04B 35/52
(52) U.S. Cl. .................... 266/286; 501/101; 222/594
(58) Field of Search .................. 501/99, 101; 222/594, 222/606, 607; 266/280, 286

(56) References Cited

U.S. PATENT DOCUMENTS 4,957,887 A * 9/1990 Michael et al. ............. 501/101
5,250,479 A * 10/1993 Rancoule et al. ........... 501/101
5,262,367 A * 11/1993 Sundell ...................... 501/101
5,628,939 A * 5/1997 Reiterer et al. ............ 264/29.1

FOREIGN PATENT DOCUMENTS

| EP | 0 423793 A2 | 4/1991 |
| JP | 58120569 | 7/1983 |
| JP | 3205349 | 9/1991 |
| WO | WO 96/34838 | 11/1996 |

OTHER PUBLICATIONS

V.A. Bron, et al., "Refractories From Granular Magnesite-Graphite Compounds", Eastern Institute of Refractories, "Ogneupory", No. 7, pp. 36–40, Jul., 1974.

* cited by examiner

Primary Examiner—Scott Kastler
(74) Attorney, Agent, or Firm—Mark Kusner; Michael A. Jaffe

(57) ABSTRACT

The invention relates to an alkaline (basic), refractory ceramic hollow item.

13 Claims, 1 Drawing Sheet

ALKALINE, REFRACTORY CERAMIC HOLLOW ITEM

This application is a continuation of International Application No. PCT/DE99/01760, with an International filing date of Jun. 15, 1999, now abandoned, which claims the benefit of German Patent Application No. DE 198 28 511.6, filed Jun. 26, 1998.

The invention relates to an alkaline (basic), refractory ceramic hollow item. The term "hollow item" comprises such molded refractory articles that do not consist exclusively of at least one refractory material within their outside dimensions. Hence, the invention does not encompass bricks, blocks, plates or the like, but primarily those hollow items that have at least one borehole, at least one through hole, or are designed as a pipe or a kind of nozzle. In particular, these include shadow pipes, submerged nozzles, tundish nozzles, sleeves, so-called stoppers, etc.

Both prior art and the invention will be described in greater detail below based on a submerged nozzle, which will be representative of all types of the aforementioned hollow items.

Submerged nozzles based on aluminum oxide with carbon bond are known from practice. Due to the poor resistance of this material to temperature changes, it is also known to make the inlet area of the submerged nozzle out of a material based on MgO—C. In this case, the two materials were separately filled into a corresponding mold, and then compression molded together. Such a manufacturing process is complicated and expensive. In addition, the transitional area of the sections comprised of various materials poses problems associated with the differing heat expansion behavior during application.

The slag resistance of such submerged nozzles is also unsatisfactory in most cases. Therefore, it was proposed that the slag area of such submerged nozzles be protected by a packing that exhibits special slag resistance. Materials based on $ZrO_2$ or $ZrO_2$—C have been proposed as a material for such a packing.

The same also applies to the submerged nozzle known from EP 0 423 793 A2, which consists of a material based on boron nitride and zirconium dioxide along with sintering aids.

However, it still holds true here that using various materials or placing a packing in the area against which a slag floating on the molten bath abuts during application is complicated from a manufacturing standpoint.

In this regard, the object of the invention is to provide a refractory ceramic hollow item for metallurgical applications that is easy to manufacture, exhibits a good resistance to temperature change and shock, and to good resistance to metallurgical slags, and preferably can be built up out of relatively simple types of material.

In this case, such a hollow item is provided in particular for those applications where a molten bath flows through the hollow item, or the hollow item comes into contact at least with a molten bath or a metallurgical slag.

Surprisingly, it was found that such a hollow item can easily be made to have a monolithic structure comprised of a single type of material. In other words, the hollow item according to the invention consists entirely of one and the same material. Therefore, separate materials need not be used in the inlet and submersion area or slag area, even though these are (additionally) possible. As a direct consequence, it becomes very easy to manufacture such a hollow item using known procedures. In particular, such a hollow item can be very easily manufactured as an isostatically press molded article, which exhibits isotropic physical, chemical and metallurgical properties throughout. According to the invention, the material to be used for the hollow item is based on a batch comprised of 10 to 40% w/w carbon (elementary carbon, in particular in the form of graphite), 50 to 89% w/w of MgO and 1 to 35% w/w of other components.

In particular with regard to their particle size and the manufacture of the hollow item, the material components must be selected based on the precondition that the finished hollow item has an open pore volume of between 5 and 20% v/v, with a most constant possible share of pores ranging from 0.1 to 15 µm.

The term "most constant possible share of pores" must be understood to mean that essentially the same values arise in the relevant pore size range during the logarithmic plotting of the pore diameter relative to the absolute share of corresponding pore diameters. For example, the share of pores with a diameter of 0.1 to 0.2 µm (or 1 to 2 µm) must essentially be equal to the share of pores with a diameter of 0.2 to 0.3 µm (or 2 to 3 µm), essentially be equal to the share of pores with a diameter of 0.3 to 0.4 µm (or 3 to 4 µm), etc. Altogether, a distribution without crass "peaks", e.g., a more or less "smooth curve", similar to FIG. 1 must arise during the logarithmic plotting of the particle sizes in the specified interval of 0.1 to 15 µm (versus the relative pore frequency in % on the ordinate); as opposed to FIG. 2, where the particle size >10 µm exhibits a characteristic, undesired "peak".

Only the pore share with an average diameter <0.1 µm or >15 µm can be subject to greater fluctuations with respect to its absolute values.

The use of a material with an essentially high content of carbon leads to a reduced heat expansion during application, and helps to optimize the micropore distribution from the standpoint mentioned above, which results in a very good thermal shock behavior. For example, the use of a material with the above composition results in a heat expansion value of 0.45% at 1,000° C., while materials containing only 14% w/w of graphite along with 80% w/w of MgO and other constituents lead to a heat expansion value of 0.65% at 1,000° C.

According to an embodiment, the batch consists of 20 to 35% w/w of carbon, 60 to 75% w/w of MgO and 1 to 10% w/w of other components.

The latter components include so-called antioxidants, such as Si-metal, or carbides, such as boron carbide.

The other components also include slight shares of non-alkaline, refractory metal oxides, such as calcined alumina. However, the share of the latter must be limited to values <5% w/w.

The MgO component of the batch can be partially or completely replaced by dolomite.

The properties of the burned hollow item are markedly improved if the batch components are homogeneously mixed and prepared in granular form before shaped. In this regard, one embodiment stipulates that the batch consist of a granularly prepared mixture of the batch components. In this case, the granules can exhibit an average diameter of between 0.1 and 2.5 mm based on another embodiment.

This makes it possible not just to improve the processability and homogeneity; in particular, the structural arrangement, and especially its pore distribution from the above standpoint, can be optimized in this way.

The resistance to temperature change can be further improved by adding nitrides, in particular silicon nitride, especially in shares of between 1 and 5% w/w.

The particular advantage lies in the fact that the hollow item is monolithic in structure, has a very good resistance to temperature change given by the adjustment between the material selection on the one hand and the pore volume and pore distribution on the other, and above all exhibits good resistance even against metallurgical slags without additional protective zones, in particular materially altered ones.

DETAILED DESCRIPTION OF PREFERRED EMBODIMENT

The invention will be described in greater detail below based on an embodiment.

In this case, the values according to the invention will be contrasted with those from prior art, which are each given in brackets after the values according to the invention.

To manufacture a submerged nozzle, a batch comprised of 27 (14) % w/w of graphite, 65 (82.5) % w/w of MgO, 4 (0) % w/w of $Al_2O_3$ and 4 (3.5) % w/w of Si metal are prepared by mixing (homogenizing).

The batch according to the invention is then processed on a granulating plate into granules with an average diameter of between 0.5 and 2.0 mm, while the comparison batch remains unchanged.

Both batches are subsequently isostatically press-molded into a submerged nozzle. This results in a density of 2.4 (2.5) $g/cm^3$ and an open porosity of 13.5 (16.5) % v/v according to EN 993-1.

The heat expansion was found to be 0.45 (0.60) % at 1,000° C. and 0.9 (1.1) % at 1,500° C. (according to DIN 51045).

Figure 1:
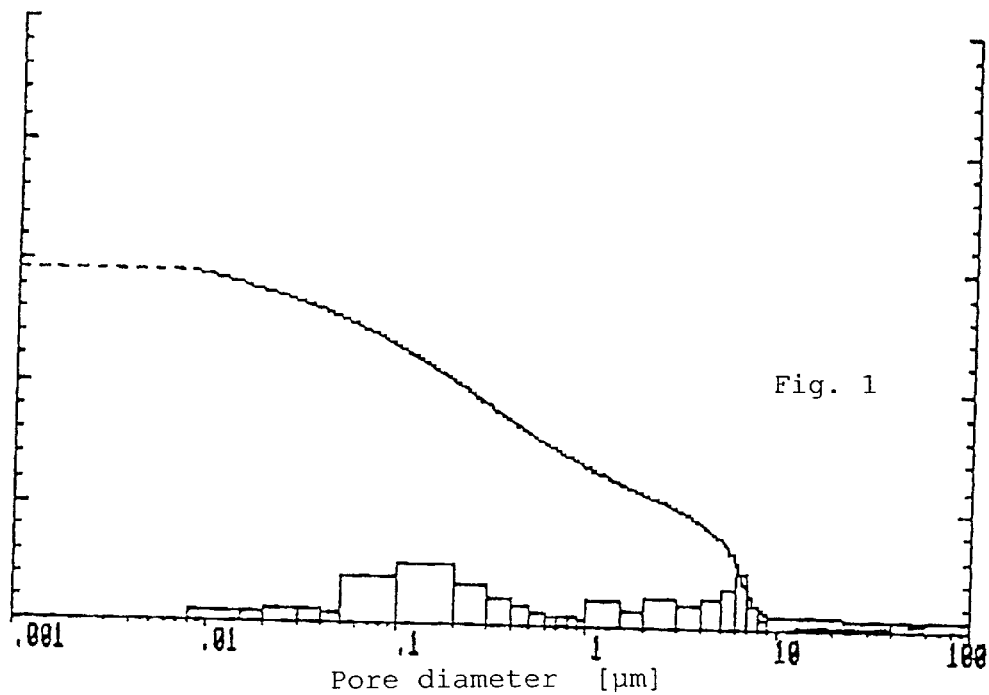
FIG. 1 shows the pore distribution for a submerged nozzle according to the invention burned at 1,000° C.
Figure 2:
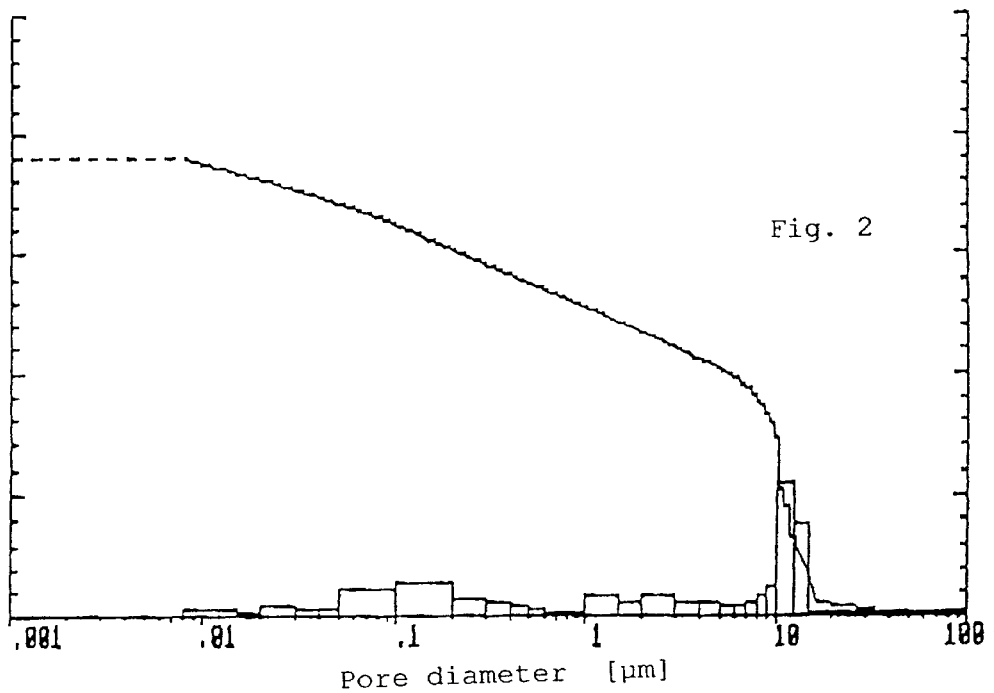
FIG. 2 shows the pore distribution for a comparison article.

The pore distribution for the submerged nozzle according to the invention burned at 1,000° C. is shown on FIG. 1, while the pore distribution for the comparison article is shown on FIG. 2.

As evident from a comparison of both figures, the pore distribution for the hollow item 7 according to the invention is significantly more uniform (nearly constant) relative to the comparison article, which exhibits a strong peak at 10 $\mu$m. The "more constant" pore distribution in a range of 0.1 to 15 $\mu$m in the example shown on FIG. 1 results in an improved resistance to temperature change through the avoidance of "pore accumulations" with a fluctuating pore distribution in the mentioned interval that is unfavorable with respect to the stated task.

We claim:

1. Alkaline, refractory ceramic hollow item for metallurgical applications, characterized by the following features comprising:

a) The hollow item is made to have a monolithic structure of a single material;

b) The material is made from a batch of 10 to 40% w/w carbon, 50 to 89% w/w of MgO and 1 to 35% w/w of other components;

c) The hollow item has an open pore volume of greater than 5% v/v up to 20% v/v, with a most constant possible share of pores ranging from 0.1 to 15 $\mu$m.

2. Hollow item according to claim 1, in which the batch is made from 20 to 35% w/w of carbon, 60 to 75% w/w of MgO and 1 to 10% w/w of other components.

3. Hollow item according to claim 1, in which the other batch components comprise an antioxidant.

4. Hollow item according to claim 1, in which the other batch components comprise 1 to 5% w/w of non-alkaline, refractory metal oxides.

5. Hollow item according to claim 1, in which the MgO component in the batch derives from dolomite.

6. Hollow item according to claim 1, in which the batch comprises a granularly prepared mixture of the batch components.

7. Hollow item according to claim 6, in which the granules in the batch exhibit an average diameter of between 0.1 and 2.5 mm.

8. Hollow item according to claim 1, in which the other batch components comprise 1 to 5% w/w nitride.

9. Hollow item according to claim 1, which is isostatically press-molded.

10. Hollow item according to claim 1, with a thermal expansion according to DIN 51045 of <0.5% at 1000° C., <1.0% at 1500° C., or both.

11. Hollow item according to claim 1, with an open pore volume of between $\geq$5 and 15% v/v according to EN 993-1.

12. Hollow item according to claim 3, in which the antioxidant is Si-metal.

13. Hollow item according to claim 8, in which the nitride is silicon nitride.

* * * * *